(12) United States Patent
Tagawa et al.

(10) Patent No.: US 6,965,546 B2
(45) Date of Patent: Nov. 15, 2005

(54) SOUND CRITICAL POINTS RETRIEVING APPARATUS AND METHOD, SOUND REPRODUCING APPARATUS AND SOUND SIGNAL EDITING APPARATUS USING SOUND CRITICAL POINTS RETRIEVING METHOD

(75) Inventors: Junichi Tagawa, Hirakata (JP); Hiroaki Yamane, Kadoma (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 399 days.

(21) Appl. No.: 10/316,185

(22) Filed: Dec. 11, 2002

(65) Prior Publication Data

US 2003/0123339 A1 Jul. 3, 2003

(30) Foreign Application Priority Data

Dec. 13, 2001 (JP) .......................... 2001-380139

(51) Int. Cl.[7] .............................................. G11B 21/08
(52) U.S. Cl. .................................. 369/30.19; 369/30.24
(58) Field of Search .......................... 369/30.19, 30.24, 369/30.03, 30.18, 47.13, 83, 53.11, 53.21, 59.16; 360/15, 48, 32; 84/609, 615, 649; 704/211, 267

(56) References Cited

U.S. PATENT DOCUMENTS

| 5,444,681 A | 8/1995 | Ishiwata et al. |
| 5,634,020 A | 5/1997 | Norton |
| 6,185,527 B1 | 2/2001 | Petkovic et al. |
| 6,310,839 B1 | 10/2001 | Lee et al. |
| 6,484,137 B1 * | 11/2002 | Taniguchi et al. .......... 704/211 |
| 2001/0017832 A1 | 8/2001 | Inoue et al. |

FOREIGN PATENT DOCUMENTS

| DE | 196 08 957 A | 9/1997 |
| EP | 1 258 879 A | 11/2002 |
| JP | 61-24085 A | 2/1986 |
| JP | 2001-283569 A | 10/2001 |
| WO | WO 01/82302 A | 11/2001 |
| WO | WO 03/043007 A | 5/2003 |

* cited by examiner

*Primary Examiner*—Ali Neyzari
(74) *Attorney, Agent, or Firm*—Smith Patent Office

(57) ABSTRACT

A sound features extracting unit receives a sound signal of a music piece to extract sound features. A peak detecting unit detects a peak time when a cost function calculated by a cost function calculating unit indicates a maximal value, and a peak value thereof. A selecting unit selects a time property indicating sound critical points from the peak time and the peak value. This method allows the user to automatically retrieve sound critical points without having to listen to the sound in advance.

25 Claims, 11 Drawing Sheets

F I G. 1
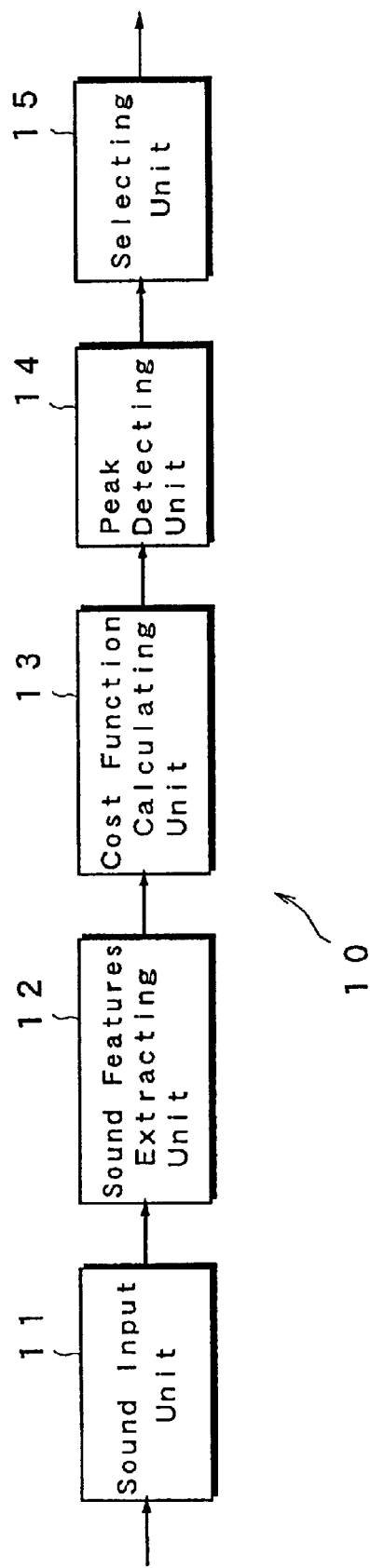

FIG. 7

| Item | Example |
|---|---|
| Track No. | JPES0900807 |
| Sound Time Length | 1mm 42s |
| Number of Sound Critical Points | 5 |
| Time of CP1 | 34.31s |
| Likelyhood of CP1 | 2832 |
| Time of CP2 | 59.60s |
| Likelyhood of CP2 | 3250 |

US 6,965,546 B2

SOUND CRITICAL POINTS RETRIEVING APPARATUS AND METHOD, SOUND REPRODUCING APPARATUS AND SOUND SIGNAL EDITING APPARATUS USING SOUND CRITICAL POINTS RETRIEVING METHOD

BACKGROUND OF THE INVENTION

1. Field of the Invention

The present invention relates to a technique for retrieving sound critical points, such as "bridge" portions of music from audio signals of the sound, and more particularly to a sound critical point retrieving apparatus, a sound reproducing apparatus and a sound signal editing apparatus using this sound critical points retrieving method.

2. Description of the Related Art

A user's manner of listening to sound using a CD player is cited for the purpose of description as an example of a conventional manner of listening to sound. In the case where a user listens to sound recorded on an audio CD, in general, the sound is sequentially reproduced starting from the beginning of the CD or the user designates the desired track number which is then reproduced. In the case where the user desires to listen to sound starting from a point within a track, such as when the lyrics begin, at the start of the second verse or at the start of the bridge portion, the user should use the fast forward or rewind functions of the CD player in order to shift starting point of reproduction to the desired position within the track.

Next, a trial listening system for electronic music distribution (EMD) is cited as an example for the purpose of description. There are many trial listening systems for EMD wherein a user can listen to a part of the sound (approximately 20 to 30 seconds) for trial as a sample of the song being sold. In many cases, such a sample for trial listening is retrieved as a part of sound that most directly expresses the sound features for sales promotion. Concretely, a sample for trial listening provides a part of sound, such as a starting part of the lyrics or a part of the bridge portion.

In the above described CD player, a user wishes to listen to the bridge portion alone of a particular track recorded on a CD, the user must first start reproduction of this track. Then, the user operates the fast forward function and rewind function while listening to the song or viewing the counter displayed on the CD player in order to shift the starting point of reproduction to the beginning of the bridge portion. Such a method is inconvenient for the user from operational point of view. In addition, in the case where the user wants to get an impression of the music on one CD or a plurality of CDs in a short time, the user must repeat such shifting operations. Such a digest reproduction increases much inconvenience of the user.

In the case where a sample for trial listening is selected in a trial listening system for EMD, the producer of the content or the manufacture of the trial listening system first listens to the entirety of the sound. Next, the producer or manufacturer finds the portion that most directly expresses the sound features by means of manual operation. Such operation of editing the content is inefficient for the producer and manufacturer. In addition, the cost of such operation represents a major portion of the costs of such trial listening system.

The above described problems are caused by the following facts. That is to say, the audio content recorded on an audio CD or the like, that is widely distributed includes only a small amount of external data. This external data is the amount of time of reproduction of the signal, the starting time of each track, the finishing time of each track, and the like. It does not include data concerning sound critical points in regard to the sound features content, such as the time when the lyrics start, the time when the bridge starts, or the like.

SUMMARY OF THE INVENTION

The present invention has been made in view of such conventional problems, and an object thereof is to implement a technique of retrieving sound critical points which express sound features from sound signals recorded on an audio CD or the like, and efficiently reproducing and editing the sound contents without causing inconvenience to the user by utilizing the sound critical points.

A sound critical points retrieving apparatus of the present invention comprises: a sound input unit which inputs a sound signal of a music piece; a sound features extracting unit which extracts predetermined sound features from the sound signal given by the sound input unit; a cost function calculating unit which calculates a cost function indicating the likelihood of sound critical points from the sound features which have been extracted by the sound features extracting unit; a peak detecting unit which detects peak times and peak values in a case where a value of the cost function calculated by the cost function calculating unit indicates a maximal value; and a selecting unit which selects sound critical points having likelihood values of a predetermined value or more from the peak times and peak values detected by the peak detecting unit.

A sound critical points retrieving method of the present invention comprises: a sound input step of inputting a sound signal of a music piece; a sound features extracting step of extracting predetermined sound features from a sound signal given by the sound input step; a cost function calculating step of calculating a cost function indicating likelihood of sound critical points from the sound features extracted in the sound features extracting step; a peak detect step of detecting peak times and peak values in a case where a value of the cost function calculated in the cost function calculating step indicates a maximal value; and a selecting step of selecting a sound critical points having likelihood values of a predetermined value or more from the peak times and peak values detected in the peak detect step.

The sound critical points retrieving apparatus and method of the present invention retrieve sound features from the sound signals and automatically retrieves sound critical points representing the sound borders of the sound by focusing on change in the sound features. Therefore, it is not necessary to listen to the music in advance in order to retrieve the sound critical points, so that the sound critical points can be retrieved without causing inconvenience to the user.

A sound reproducing apparatus of the present invention comprises: a sound storing unit which stores a sound signal of a music piece; a sound property storing unit which stores sound property including time property and likelihood property of sound critical points representing the sound borders provided so as to correspond to a sound title; a sound reproducing unit which reproduces a sound signal of a music piece stored in the sound storing unit starting from an arbitrary position; and a reproduction control unit which controls the reproduction of the sound reproducing unit by referring to the property of sound stored in the sound property storing unit.

A sound reproducing method of the present invention comprises: a sound storing step of storing a sound signal of a music piece; a sound property storing step of storing a sound property including time property and likelihood property of sound critical points representing sound borders provided so as to correspond to a sound title; a sound reproducing step of reproducing a sound signal of the music piece stored in the sound storing step starting from an arbitrary position; and a reproduction control step of controlling reproduction in the sound reproducing step by referring to the property of sound stored in the sound storing step.

The sound reproducing apparatus and method of the present invention retrieve sound critical points of the sound signals and controls reproduction through reference to this sound critical point data at the time of reproduction of the sound. The sound signals are instantaneously reproduced from the border portions of phrases representing sound features. Therefore, the sound features portions can be reproduced and presented without causing inconvenience to the user from the operational point of view.

A sound signal editing apparatus of the present invention comprises: a sound storing unit which stores a sound signal of a music piece; a sound input unit which inputs the sound signal of the music piece stored in said sound storing unit; a sound features extracting unit which extracts predetermined sound features from the sound signal given by the sound input unit; a cost function calculating unit which calculates a cost function indicating the likelihood of sound critical points from the sound features which have been extracted by the sound features extracting unit; a peak detecting unit which detects peak times and peak values in a case where a value of the cost function calculated by the cost function calculating unit indicates a maximal value; a selecting unit which selects sound critical points having likelihood values of a predetermined value or more from the peak times and peak values detected by the peak detecting unit; a section calculating unit which calculates a signal section in order to edit sound on the basis of sound critical points selected by the selecting unit; and a sound signal editing unit which edits the sound signal of the music piece stored in the sound storing unit on the basis of the signal section calculated by the section calculating unit.

A sound editing method of the present invention comprises: a sound storing step of storing a sound signal of a music piece; a sound critical points retrieving step of retrieving a sound critical point, which is a sound border, from the sound signal of the sound storing step; a section calculating step of calculating a signal section which carries out edition of the sound on the basis of the sound critical points retrieved in the sound critical points retrieving step; and a sound editing step of editing the sound signal of the music piece stored in the sound signal storing step on the basis of the signal section calculated in the section calculating step.

The sound signal editing apparatus and method of the present invention calculate the sound critical points from the sound signals of the music piece and automatically calculates section data for editing the sound features portions of the sound on the basis of these sound critical points. Therefore, it is not necessary for the editor to listen to the music in advance in order to retrieve the sound critical points for selection, thereby editing of the sound features portions of the sound.

BRIEF DESCRIPTION OF THE DRAWINGS

FIG. 1 is a configuration diagram of a sound critical points retrieving apparatus according to a first embodiment of the present invention;

FIG. 7 is a diagram for describing an example of sound properties of one track of sound in the sound reproducing apparatus according to the second embodiment;

Figure 2:
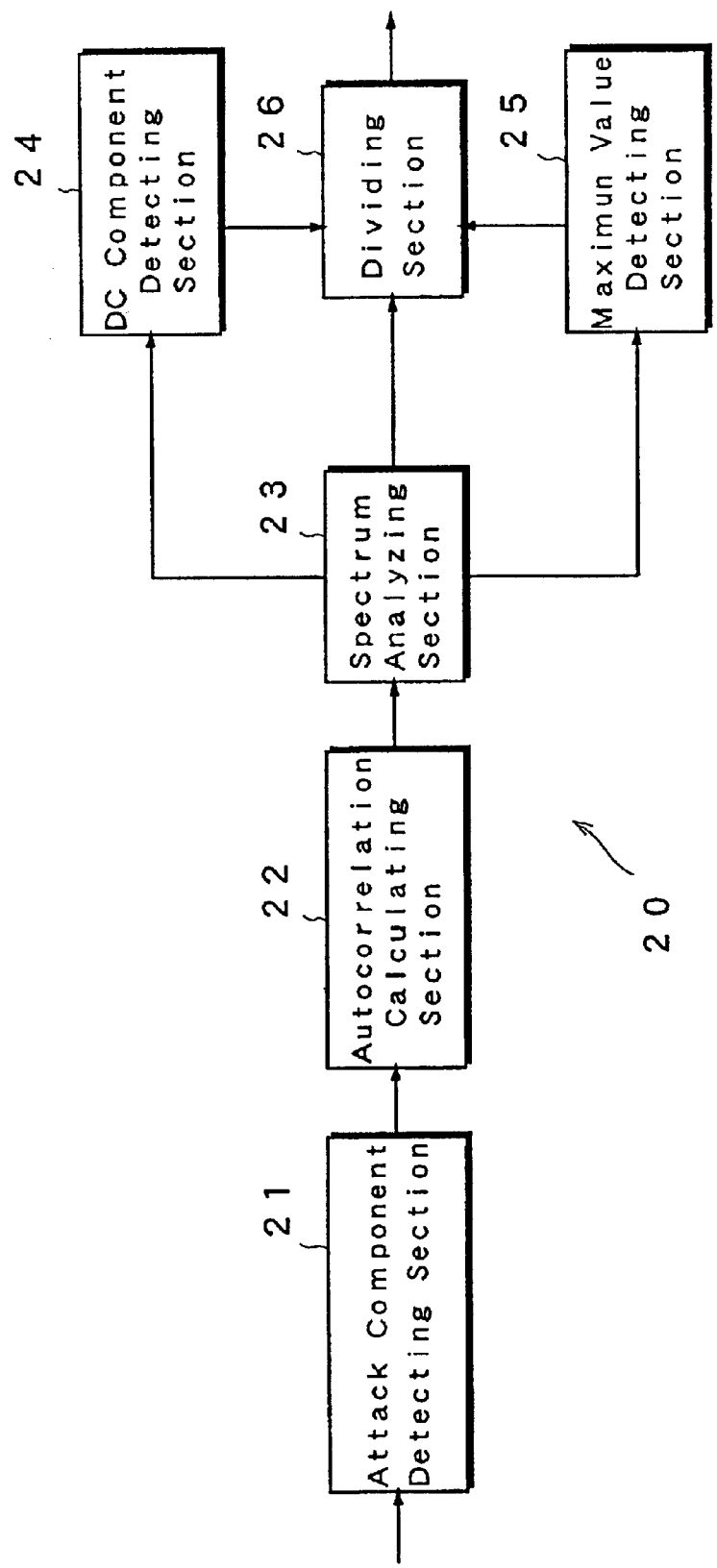
FIG. 2 is a configuration diagram of a beat noisiness calculating unit used in the sound critical points retrieving apparatus of the first embodiment.

DESCRIPTION OF THE PREFERRED EMBODIMENTS (First Embodiment)

First, a sound critical points retrieving apparatus will be described as a first embodiment of sound critical points retrieving techniques. FIG. 1 is an entire configuration diagram of a sound critical points retrieving apparatus 10 according to the first embodiment of the present invention. The sound critical points retrieving apparatus 10 is an apparatus for retrieving and outputting sound critical points from inputted acoustic signals. The sound critical points retrieving apparatus 10 includes a sound input unit 11, a sound features extracting unit 12, a cost function calculating unit 13, a peak detecting unit 14 and a selecting unit 15.

Sound critical points indicate critical points in acoustic signals of the sound, which is, for example, a transition part from the intro portion to the main vocal portion, a part that the type of instrument changes, a part that the rhythm changes, a part of modulation, a part that the sound pressure abruptly increases, a transition part from the main melody to the ending, or the like. A property of the sound critical points includes a type property obtained by coding the types of these sound critical points, a time property indicating time of occurrence of sound critical points, and a likelihood property obtained by quantifying the likelihood of sound critical points. Though these properties are determined by the human auditory sensing system and cerebrum, only types which can physically be determined are objects of the present invention. Here, in the case where there are accompanying video, such as a video clip, the human visual sensing system, auditory sensing system and cerebrum make the determination. The time property indicates the amount of time that has elapsed from the beginning of respective tracks and is generally represented by a b minute and c d second. In the case where the musical score data is known, the time can be specified according to the bar number.

The sound input unit 11 inputs a sound signal that becomes the object of retrieval of sound critical points such as audio content recorded on an audio CD, or the like. The sound features extracting unit 12 analyses every frame period, which is a short period of time, of a sound signal acquired by the input unit 11, and extracts and outputs sound features associated with sound critical points of one or a plurality of types. This sound features is a predetermined physical amount.

The cost function calculating unit 13 calculates a cost function representing the degree of likelihood of sound critical points from the sound features extracted by the extracting unit 12 and then outputs the cost function. The peak detecting unit 14 detects one or a plurality of portion(s) wherein the cost function calculated by the calculating unit 13 indicates a maximal value and outputs the time and peak value thereof. The selecting unit 15 outputs the time property and property data of the portion that is considered to be the sound critical point from among the plurality of peak values outputted by the peak detecting unit 14.

Here, the operation of the sound features extracting unit 12 will be described in detail. The extracting unit 12 extracts (a) the root mean square (RMS) of signals, (b) beat noisiness, (c) attack ratio and the like, as sound features. These sound features will be described in the following.

(a) Root Mean Square

The root mean square value is the sound features that represents the magnitude of amplitude in this process frame. The root mean square value $RMS_i$ of the signal in the i-th processing block is derived from the following equation (1):

$$RMS_i = \sqrt{\frac{\sum_{n=0}^{M-1} x^2(n)}{M}}, \quad (1)$$

wherein x(n) represents the amplitude value of the signal at time n within the block and M represents the number of samples in one block. The greater the RMS value is, the greater the average amplitude of the signal is within this block. The root mean square value becomes the sound features representing the change in magnitude of the sound.

(b) Beat Noisiness

Beat noisiness is the sound features representing the beat noisiness of sound components forming the sound. In the case where the notes of the sound are regular or periodic, the beat noisiness is small. Contrarily, in the case where the note pattern of the sound is varied, the beat noisiness is great.

FIG. 2 is a configuration diagram of a beat noisiness calculating block 20. The beat noisiness calculating block 20 calculates the beat noisiness from the sound signal that has been inputted, and the result is outputted. The beat noisiness calculating block 20 includes an attack component detecting section 21, an autocorrelation calculating section 22, a spectrum analyzing section 23, a DC component detecting section 24, a maximum value detecting section 25 and a dividing section 26.

The attack component detecting section 21 detects attack components of sounds from the inputted sound signal. The attack components can be detected by dividing the signal into frames having a short period of time, by carrying out frequency analysis for every frame, and by extracting the signal portion wherein the power has abruptly changed according to difference in power of the signals in adjoining frames and in adjoining frequencies. As for the method of detection of attack components, the detail thereof is described in, for example, reference, "Beat Tracking System for Music Sound Signals," Goto and Muraoka, IPSJ SIG Notes, Vol. 94, No. 71, pp. 49–56, 1994.

The autocorrelation calculating section 22 calculates the autocorrelation function of the attack component of a signal that has been detected by the detecting section 21. The spectrum analyzing section 23 carries out frequency analysis on the autocorrelation function of the attack component found by the calculating section 22 according to Fourier transformation or the like, and outputs the power for every frequency band.

The DC component detecting section 24 extracts solely the DC components from the output signal from the spectrum analyzing section 23 and outputs the power thereof. The maximum value detecting section 25 outputs the power of the band that exhibits the greatest value from among the output signals of the spectrum analyzing section 23. The dividing section 26 divides the output of the DC component detecting section 24 by the output of the maximum value detecting section 25. That is to say, the dividing section 26 divides the power of the DC component, from among the signals found by the spectrum analyzing section 23, by the power of the band indicating the maximum value.

The autocorrelation function of attack components represents the periodicity of sounds. In the case where the sounds are periodically outputted, the value of this periodic portion of the autocorrelation function becomes great. When a spectrum is analyzed on the autocorrelation function of attack components, the power of the sounds that are not periodic appear as direct components. Contrarily, the periodic components of the main sounds that form the rhythm of this sound appear as the maximum value. Therefore, a sound features indicating whether or not the object sounds are periodic in the portion of the analysis can be extracted by dividing the DC components by the maximum value.

As for popular songs, for example, sounds having a constant period exist in a portion wherein a constant rhythm pattern is repeatedly played and, therefore, beat noisiness becomes small. Contrarily, the frequency of sounds that are periodic becomes low in a fill-in portion where the rhythm abruptly changes and, therefore, beat noisiness becomes great.

(c) Attack Ratio

Figure 3:
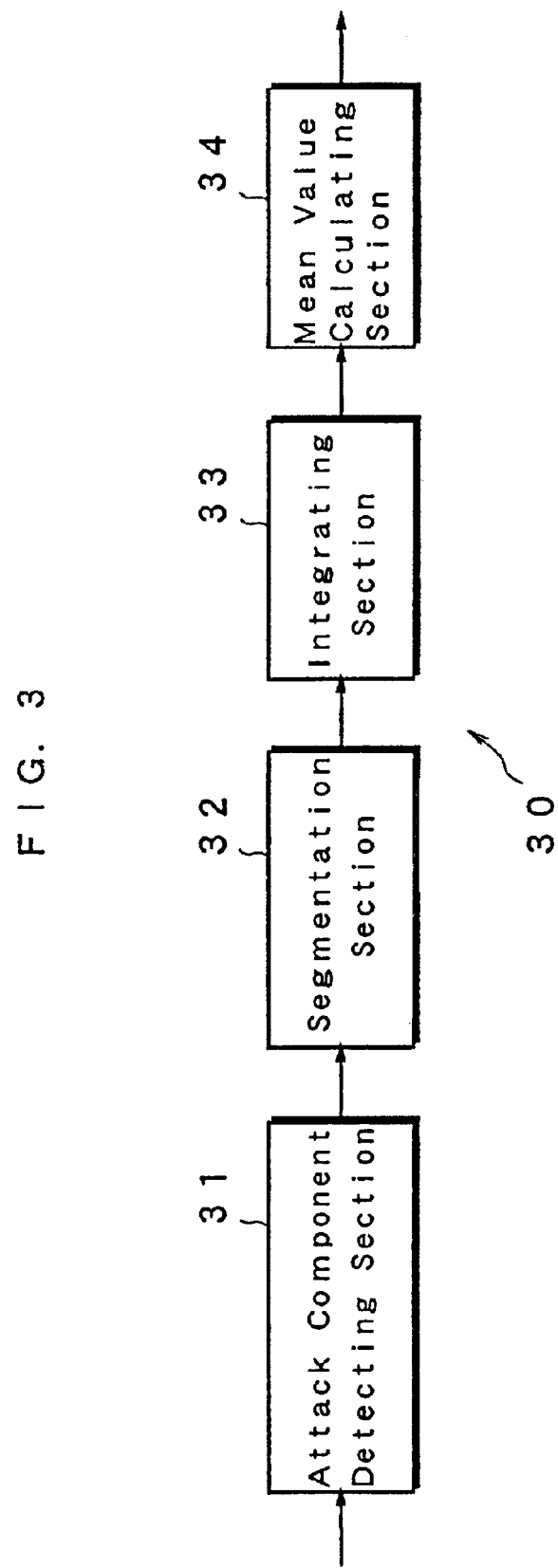
FIG. 3 is a configuration diagram of an attack ratio calculating unit used in the sound critical points retrieving apparatus of the first embodiment.

The attack ratio is the sound features representing frequency of sound production forming the sound per unit hour. FIG. 3 is a configuration diagram of the attack ratio calculating block. This attack ratio calculating block 30 calculates the attack ratio from the inputted sound signal, and outputs the result. The calculating block 30 includes an attack component detecting section 31, a segmentation section 32, an integrating section 33 and a mean value calculating section 34.

The detecting section 31 detects the attack components of sound from the inputted sound signal. The detection method is the same as in the attack component detecting section 21 of FIG. 2 and attack components are outputted for every band. The segmentation section 32 checks the absolute value of the amplitude of the output signal from the detecting section 31 and outputs 0 in the case where the amplitude is the threshold value or less, for example when the amplitude is 0, and outputs 1 in the case where the amplitude exceeds the threshold value. Thus, the segmentation section 32 digitizes the input signal. The integrating section 33 adds up the values of the inputted signal for the time of every frame in the direction of frequency, and outputs the result. The mean value calculating section 34 calculates the time average of the inputted added value, and outputs the result.

The existence of an attack in sound in each band for the time of every frame can be detected by carrying out a segmentation section process on attack components in the above described manner. Such existences of attacks in sounds are added together for every frame time and an averaging process is carried out, thereby a frequency index of the sounds in the object section of analysis can be obtained.

In FIG. 1 the cost function calculated by the cost function calculating unit 13 is set so as to indicate the degree of likelihood of sound critical points. In the sound features extracting unit 12, for example, the root mean square in the i-th processing block is denoted as $RMS_i$, the beat noisiness is denoted as $NZ_i$ and the attack ratio is denoted as $AR_i$, and then the cost function $CP_i$ is defined in the following equation (2):

$$CP_i = RMS_i \times NZ_i \times AR_i \qquad (2).$$

The root mean square (RMS) represents the magnitude of the sound. The beat noisiness (NZ) represents the degree of change in the rhythm of the sound. The attack ratio (AR) represents the frequency of notes in the sound, that is to say, the "cheerfulness". Therefore, the cost value in equation (2) wherein they are multiplied by each other means that the greater the sound, the change in rhythm is and the more cheerful the sound is, the greater the likelihood of the sound critical points is.

In the case of popular songs, for example, the sound is formed of several phrases, such as, intro→A pattern melody→bridge→B pattern melody→ending. A pattern that is performed for a short period of time, referred to as a fill-in, having rhythm patterns different from preceding and following portions is inserted between the respective phrases in order to express a clear change in phrases. In addition, the rhythm pattern changes greatly from phrase to phrase. In addition, such a fill-in portion is performed in a manner so as to provide accent to the song and, therefore, the number of types of sounds performed and instruments used in the sound increases and sound volume increases. Such a tendency can be determined in response to empirical rule with regard to sound. Therefore, above described equation (2) is defined in order to detect such change between phrases.

Here, the cost function calculated by the cost function calculating unit 13 uses values from multiplication wherein three variables are multiplied as in equation (2). Here, the cost function may be the value from multiplication of any two variables or may be one of any three variables.

Figure 4:
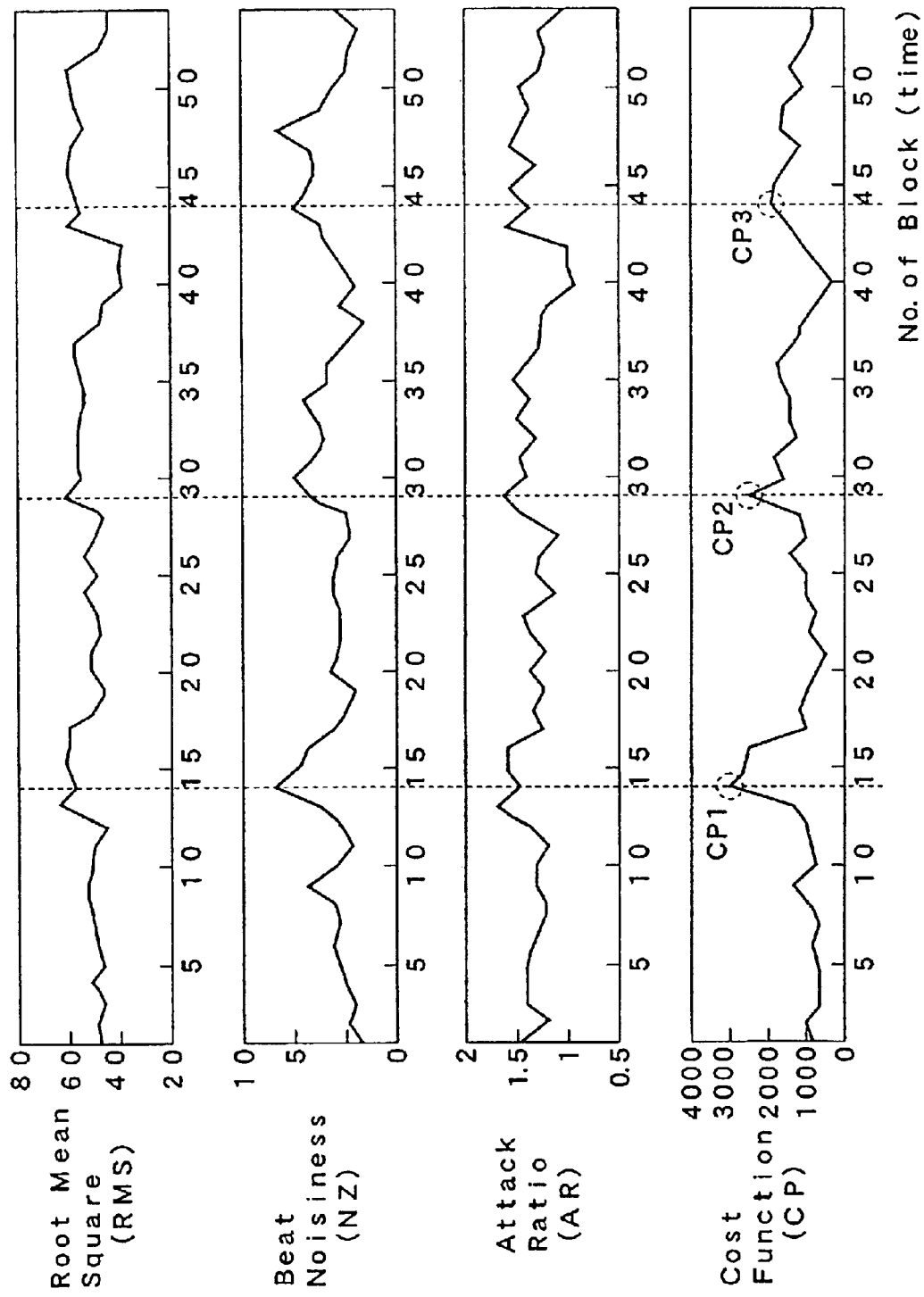
FIG. 4 is a characteristics graph showing measurement examples of cost functions and sound features in a sound features extracting unit of the sound critical points retrieving apparatus according to the first embodiment.

FIG. 4 shows calculated examples of root mean square value, beat noisiness, attack ratio and cost function which are sound features in a type of signal. In FIG. 4 critical points 1, 2 and 3, respectively, represent starting point times of bridge portions in the signal. CP1, CP2 and CP3 in the figure are portions where the cost function CP indicates maximal values. It is understood from this figure that the cost function indicates maximal values at critical points.

The peak detecting unit 14 in FIG. 1 detects portions showing peak from the cost function as candidates for sound critical points. In the case of the cost function CP of FIG. 4, the peak detecting unit 14 outputs times and magnitudes of portions showing peaks, including CP1, CP2 and CP3. Then, the selecting unit 15 selects a portion that appears to be a sound critical point according to a predetermined procedure from among the peaks detected by the peak detecting unit 14. In this case, the selecting unit 15 selects data necessary for the following process as sound critical point data from among the above described type data, time property and likelihood property, as described above. One of methods for the order of selection is to output sound critical points having a high likelihood in the order of peak value magnitude. In the case of FIG. 4, the selecting unit 15 outputs the time property of the sound critical points in the order of CP1, CP2 and CP3, and adds, as the likelihood of sound critical points, the peak values thereof to property data of the respective peaks.

In addition, a threshold value is set at the selecting unit 15 at the time of selection of peaks of the cost function. The selecting unit 15 excludes peaks having magnitudes of the threshold value or lower from candidates of the sound critical points, thereby preventing a detection error concerning a sound critical point. In addition, sound critical points indicate borders between phrases of a constant length of time, such as between an A pattern melody and a bridge. In some cases sound critical points are set on the basis of time constraint conditions in an empirical rule with regard to sound.

Figure 5:
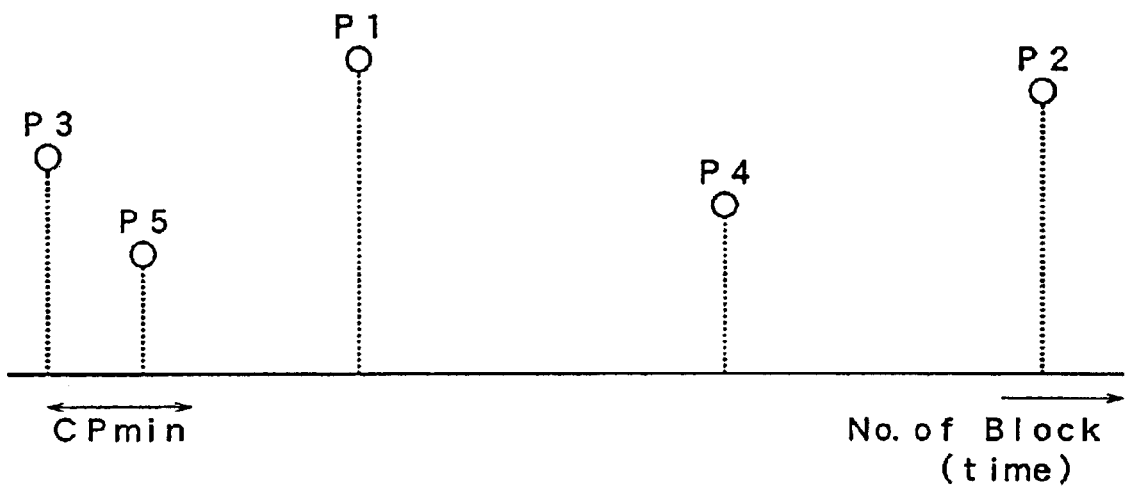
FIG. 5 is a graph for schematically describing peaks extracted from a cost function.

FIG. 5 is a diagram for description wherein peaks detected in the cost function are schematically shown. In FIG. 5 P1 to P5 indicate candidates for sound critical points detected in the cost function by means of the peak detecting unit 14. The minimum time interval CPmin between sound critical points is predetermined. Thereby peak intervals of which the time intervals are shorter than CPmin determined in the empirical rule with regard to sound are improper. That is to say, either peak P3 or P5 is considered to be improper as a sound critical point. There is a high possibility of mistaken detection of the smaller peak. In the example of FIG. 5, the interval between peaks P3 and P5 is smaller than CPmin and, therefore, peak P5 is excluded from the candidates for a sound critical point. According to such a process, mistaken detection of sound critical points can be prevented.

(Second Embodiment)

Figure 6:
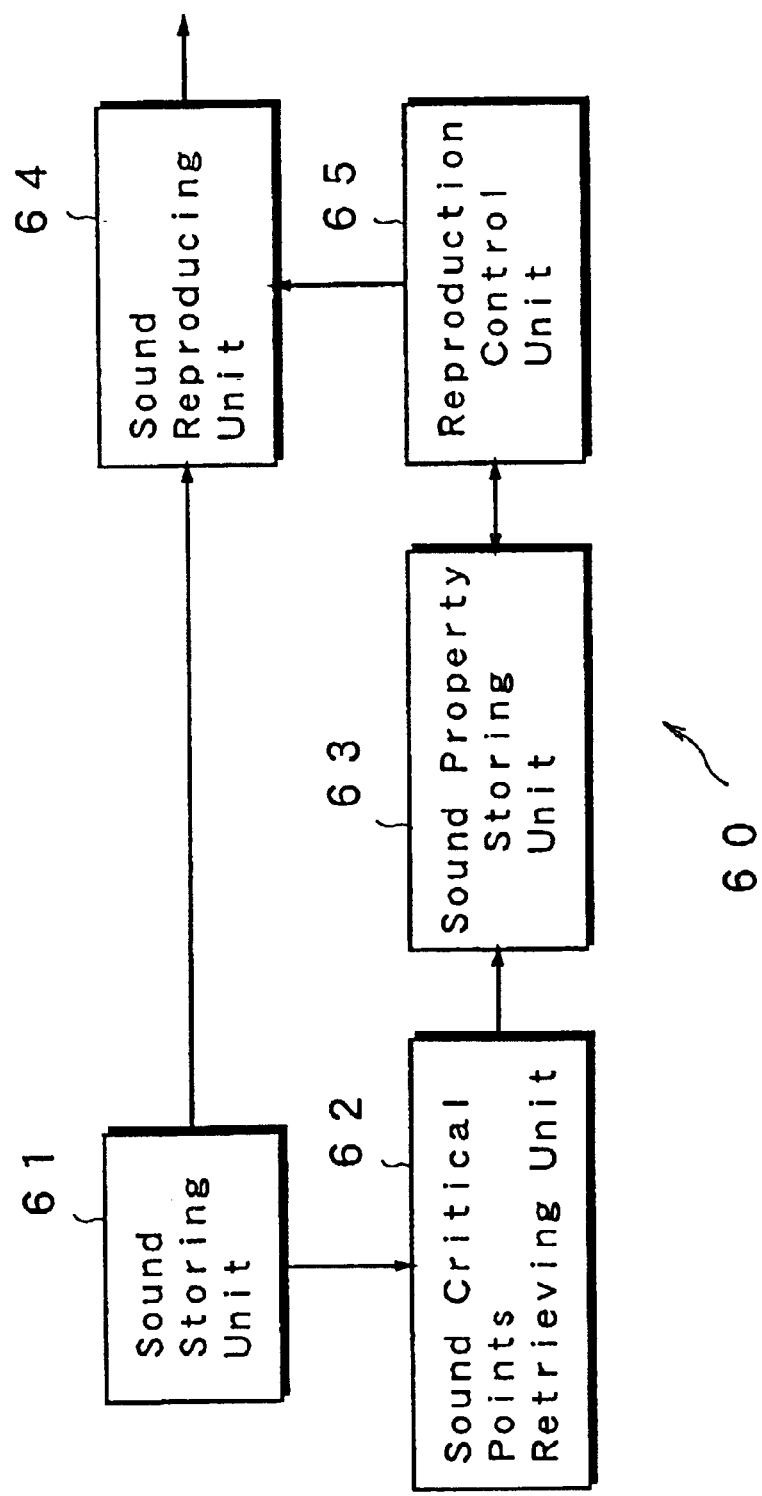
FIG. 6 is a configuration diagram of a sound reproducing apparatus according to a second embodiment of the present invention.

Next, a sound reproducing apparatus of the sound critical points retrieving technology according to a second embodiment of the present invention will be described. FIG. 6 is a configuration diagram of a sound reproducing apparatus 60 according to the second embodiment of the present invention. This sound reproducing apparatus 60 includes a sound storing unit 61, a sound critical points retrieving unit 62, a sound property storing unit 63, a sound reproducing unit 64 and a reproduction control unit 65.

The sound reproducing unit 60 reproduces a sound signal recorded in the storing unit 61 according to the following procedure. First, the sound critical points retrieving unit 62 retrieves sound critical points of respective pieces of sound from the sound signal stored in the storing unit 61 and stores the retrieved sound critical point data in a predetermined region of the sound property storing unit 63. Next, in the case where the user requests reproduction, the reproduction control unit 65 indicates the reproduction start point of the sound to the reproducing unit 64 by referring to the storing unit 63. Then, the reproducing unit 64 reproduces the sound from the storing unit 61 starting from the indicated portion.

Here, the configuration and operation of each part of the sound reproducing apparatus 60 will be described in detail. The storing unit 61 is a medium that records a sound signal in a reproducible manner. The storing unit 61 includes, for example, a CD, a DVD, an HDD, a medium such as a non-volatile memory, and a section that refers to a sound signal recorded on this medium.

A sound signal of a music piece recorded in the storing unit 61 is inputted to the sound critical points retrieving unit 62. The retrieving unit 62 retrieves sound critical points of this sound. The retrieving unit 62 has the same configuration as the sound critical points retrieving apparatus described in the first embodiment and outputs the sound property including the time property indicating sound critical points of the respective pieces of sound.

The sound property storing unit 63 records data concerning the sound critical points retrieved by the retrieving unit 62 and sound property data such as length of performance provided with the sound. FIG. 7 shows an example of a sound property for one piece of sound stored in the storing unit 63. The object of this sound property is, for example, sound recorded on a CD. In FIG. 7, track numbers are symbols and numbers that can uniquely specify these pieces of sound. The sound time length is the length of the performance time of these pieces of sound. The number of sound critical points is the number of sound critical points included in these pieces of sound. Time of critical points 1 and 2 are times indicating first and second sound critical points, respectively. The likelihood of critical points 1 and 2 correspond to likelihood values of first and second sound critical points, respectively. The sound property as shown in FIG. 7 is prepared for every piece of sound recorded in the sound storing unit 61 and can be referred to at any time from the reproduction control unit 65.

The reproduction control unit 65 controls the sound reproducing unit 64 so that the reproduction form selected by the user is obtained concerning an arbitrary piece of signal stored in the storing unit 61 according to a request from the user. The sound reproducing unit 64 reproduces an arbitrary piece of sound stored in the storing unit 61 according to the control of the reproduction control unit 65 and outputs a sound signal that is audible to the user.

Forms of reproduction of sound include reproduction of sound from the beginning, reproduction after fast forwarding from the beginning to an arbitrary point, reproduction with indication of reproduction start time, and the like. In addition to these forms of reproduction that are possible with a conventional CD, reproduction starting from a sound critical point can be selected.

Figure 8:
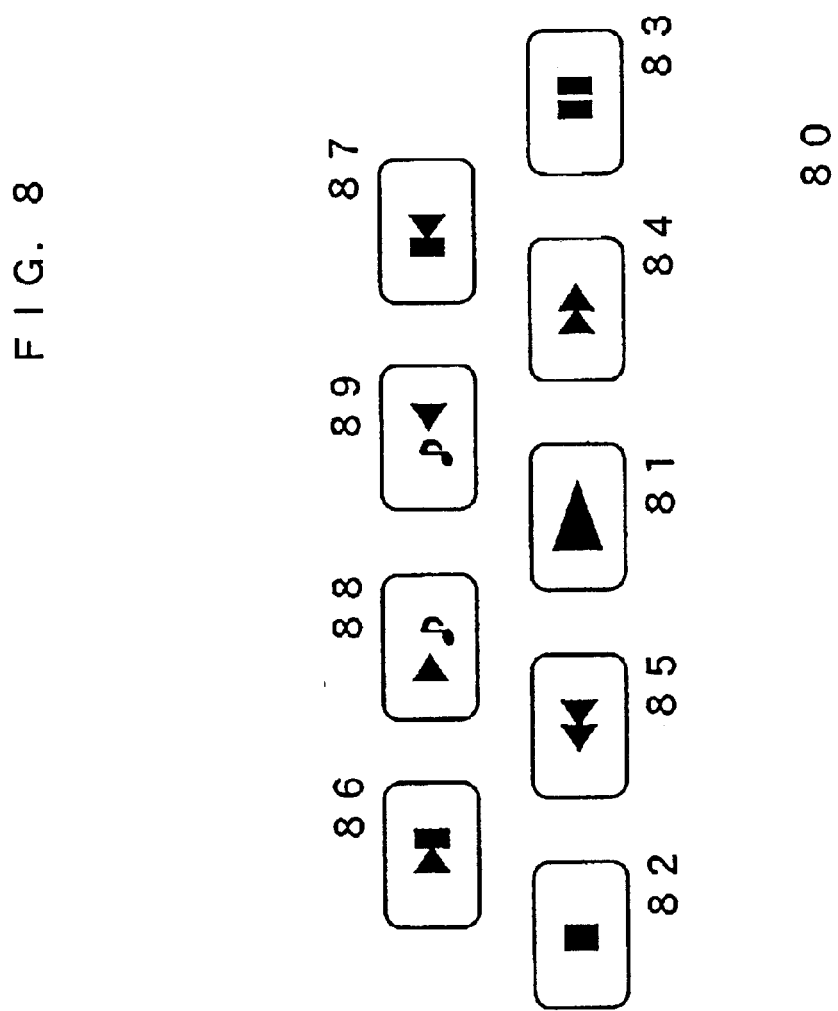
FIG. 8 is a conceptual diagram of a reproduction operating section in the sound reproducing apparatus according to the second embodiment.

A method wherein reproduction is indicated by the user and the operation in such a case are described in reference to FIGS. 6 and 8. FIG. 8 shows reproduction operating block 80 of the sound reproducing apparatus 60. The reproduction operating block 80 is provided with a reproduction button 81, a stop button 82, a pause button 83, a fast forward button 84, a rewind button 85, a skip button 86, a previous track button 87, a critical point skip button 88, a previous track of critical point button 89, and a track select button 810.

In the case an user desires to reproduce sound, in order from the beginning of a CD, the user presses the reproduction button 81. The reproduction control unit 65 in FIG. 6 accesses property data of this CD recorded in the sound property storing unit 63 and accesses the sound signal of the music piece stored in the storing unit 61 according to the order of the pieces of sound corresponding to track numbers. The sound reproducing unit 64 reproduces the respective pieces of sound in accordance with such access control.

When the user presses the critical point skip button 88, the reproduction control unit 65 refers to the property data of the sound piece being object of reproduction recorded in the storing unit 63 and obtains critical point time property. Then, the reproduction control unit 65 indicates the critical point time to the sound reproducing unit 64 as the time for start of reproduction, thereby starting reproduction from the critical point. When the user presses the critical point skip button 88 again during reproduction, the reproduction control unit 65 acquires the next critical point time according to the same procedure so as to control sound reproducing unit 64 and starts reproduction at that time.

When the user selects reproduction starting from a sound critical point, reproduction starts from the sound division such as from the beginning of the bridge portion or from the beginning of A pattern melody of the sound. That is to say, reproduction instantly starts from the portion showing the sound features of this sound. In addition, in the case where the user selects reproduction starting from a sound critical point, the method for selecting a critical point may be a prioritized method for reproduction starting from the critical point having a high likelihood, for example, starting from the time of the lower number in FIG. 7. In addition, there is also a method for reproduction in the ascending order of critical point time. The method for selecting a critical point at the time of reproduction can be predetermined by user selection or by the setting of the system, according to either alternative.

Here, in the above second embodiment, an example is described wherein the storing unit 61 refers to a signal stored in a CD. However, the above described process can be applied in the same manner to a signal recorded on another medium such as DVD, HDD, non-volatile memory or the like.

Here, the sound reproducing apparatus 60 shown in FIG. 6 does not have to have the sound critical points retrieving unit 62. In such a case, the time property and likelihood property of sound critical points representing sound borders are externally provided as the property of sound. The sound property storing unit 63 stores the property so as to correspond to titles of pieces of sound. The sound reproducing unit 64 reproduces the sound signal of the music piece stored in the sound storing unit 61 starting from an arbitrary position.

(Third Embodiment)

Figure 9:
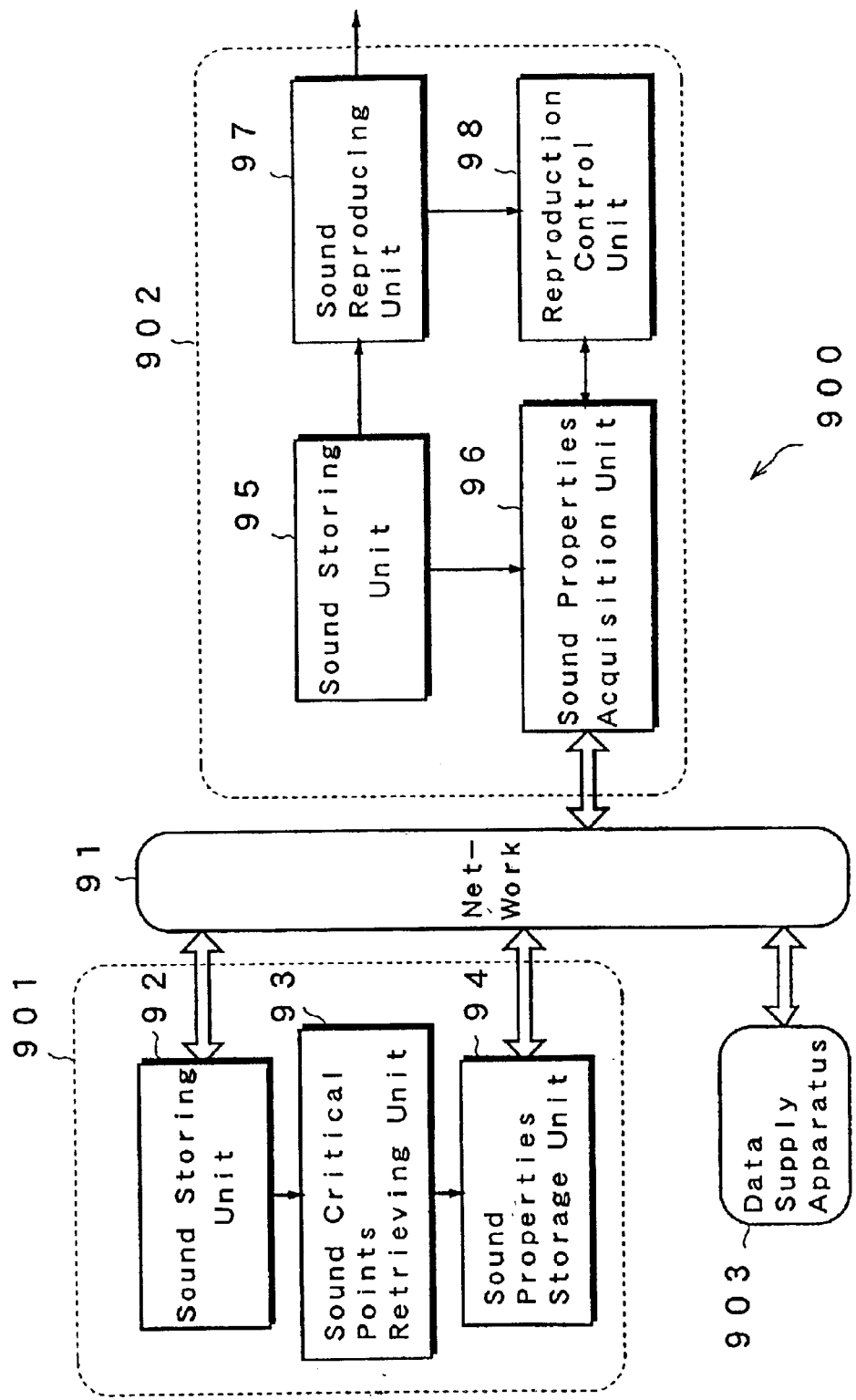
FIG. 9 is a configuration diagram of a sound reproducing system according to a third embodiment of the present invention.

Next, a sound reproduction system of the sound critical points retrieving technology according to a third embodiment of the present invention will be described. FIG. 9 is a configuration diagram of a sound reproduction system 900 according to the third embodiment. This sound reproduction system 900 includes a data supply apparatus 901, a communication network 91, a sound reproducing apparatus 902 and a data supply apparatus 903. The data supply apparatuses 901 and 903 are apparatuses of which the main purpose is to supply sound property to the sound reproducing apparatus 902 and have first sound storing unit 92, sound critical points retrieving unit 93 and sound properties storing unit 94. The sound reproducing apparatus 902 is an apparatus for reproducing a sound signal recorded on a CD or the like, through operation by the user. The sound reproducing apparatus 902 has a second sound storing unit 95, sound properties acquisition unit 96, sound reproducing unit 97 and reproduction control unit 98.

The sound reproducing apparatus 902 can access the data supply apparatus 901 or the data supply apparatus 903 through the communication network 91, such as through the Internet. The sound reproducing apparatus 902 acquires data from the data supply apparatus 901, if necessary, at the time when the sound signal stored in the sound storing unit 95 is reproduced, thereby sound can be reproduced utilizing sound critical points.

Next, the configuration and operation of the respective parts of the sound reproduction system 900 will be described in detail. The sound storing unit 92 of the data supply apparatus 901 records a sound signal of a music piece in a reproducible form. The sound storing unit 92 includes a medium such as, CD, DVD, HDD or non-volatile memory, and a section for referring to a sound signal recorded such a medium.

A sound signal recorded in the sound storing unit 92 is inputted to the sound critical points retrieving unit 93, which retrieves sound critical points of sound. The retrieving unit 93 has the same configuration and operation as the sound critical points retrieving apparatus described in the first embodiment and outputs the sound property including the time property indicating sound critical points of the respective pieces of sound.

The sound properties storing unit 94 stores data sound property, such as concerning sound critical points retrieved by the retrieving unit 93 and length of performance time, provided with the sound. The sound property has the same content as described in the second embodiment.

In the sound reproducing apparatus 902, the storing unit 95 is a memory wherein a sound signal is recorded in a reproducible form. The storing unit 95 includes a medium such as CD, DVD, HDD or non-volatile memory, and a section for referring to a sound signal recorded such a medium. Track numbers that can uniquely represent the respective pieces of sound are added in advance, as described in FIG. 7, to the respective pieces of sound stored in the storing unit 95, which can be referred to by the acquisition unit 96.

The acquisition unit 96 acquires a portion of or the entirety of sound properties of the sound stored in the storing unit 95 by referring to the sound properties storage 94 of the data supply apparatus 901. The above described track numbers added to the respective pieces of signal are referred to as keys at the time when property data of signal is acquired from sound properties storing unit 94, thereby sound property data corresponding to the track number can be acquired.

The reproduction control unit 98 controls the sound reproducing unit 97 so that an arbitrary piece of sound stored in the storing unit 95 becomes of a form for reproduction as chosen by the user according to a request by the user. The sound reproducing unit 97 reproduces an arbitrary piece of sound stored in the sound storing unit 95 according to the control of the reproduction control unit 98 and outputs a sound signal that is audible to the user. The form of reproduction is the same as in the sound reproducing apparatus 60 described in the second embodiment and sound property of the respective pieces of sound acquired by means of the acquisition unit 96 is utilized in the case where the sound property is necessary at the time of reproduction control.

In addition, the sound reproducing apparatus 902 can refer to the data supply apparatus 903 in addition to the data supply apparatus 901. The data supply apparatus 903 is an apparatus for supplying the sound property in the same manner as the data supply apparatus 901.

The sound properties acquisition unit 96 first refers to the data supply apparatus 901 in order to acquire the sound property stored in the storing unit 95. In the case where the acquisition unit 96 cannot acquire this sound property from the data supply apparatus 901, the property acquisition unit refers to another data supply apparatus 903 and attempts to acquire this sound property. The system is configured in such a manner so that property data can be acquired from a plurality of data supply apparatuses, thereby the reliability of property data acquisition can be increased.

Here, as for a method for designating which data supply apparatus from among a plurality of data supply apparatuses is designated for reference, there are methods wherein a priority is set in advance for the sound properties acquisition unit 96 so that the data supply apparatuses are referred to according to the order of this priority and wherein the user can select which the data supply apparatus is to be referred to according to the user's wish.

Here, though the data supply apparatus 901 retrieves sound critical points from a sound signal by means of the sound critical points retrieving unit 93, it is not necessary for another data supply apparatus 903 to be provided with a critical point retrieval unit but, rather, the activity of the critical points retrieving unit may be carried out by another method, for example, by manual retrieval of critical points.

(Fourth Embodiment)

Figure 10:
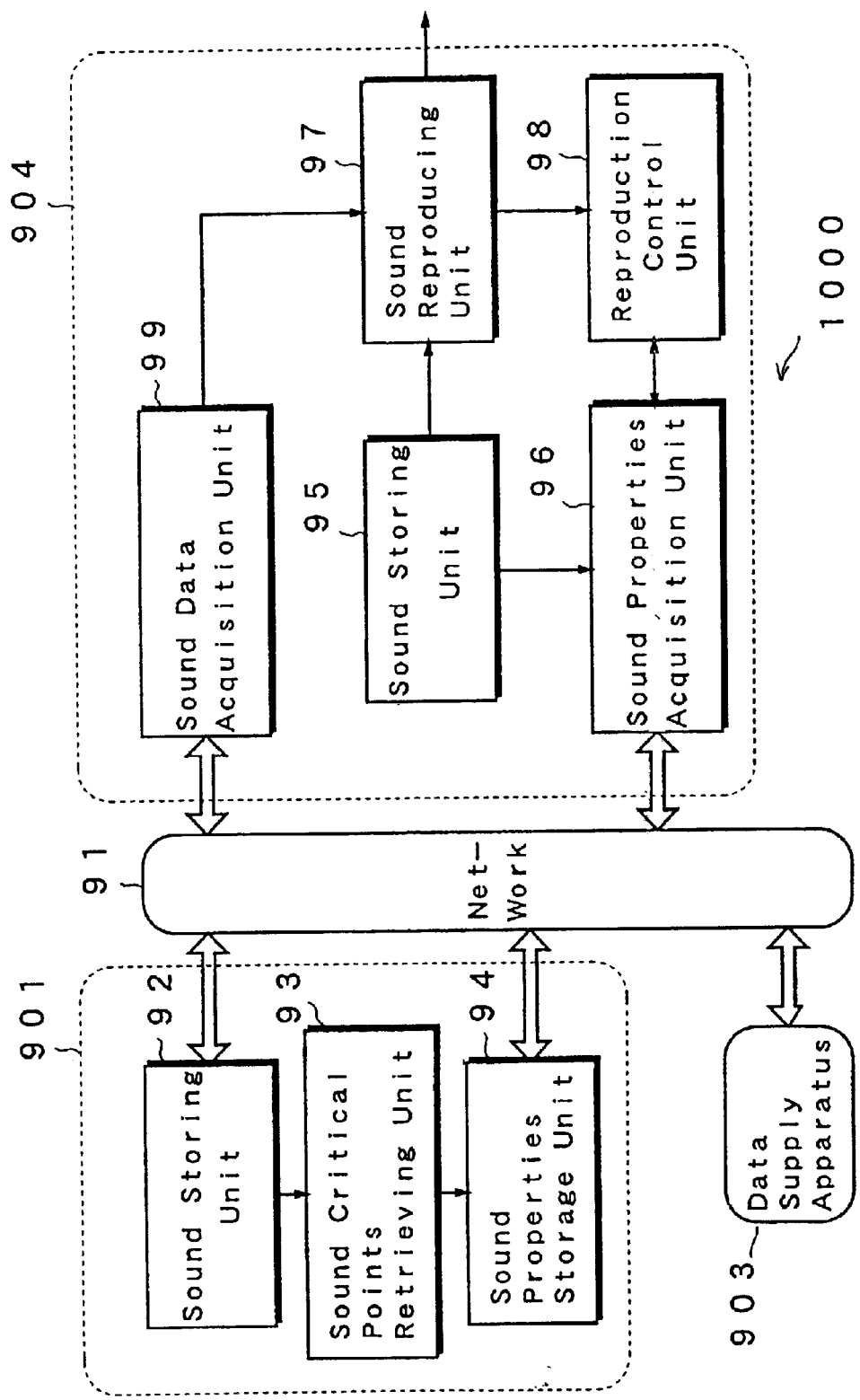
FIG. 10 is a configuration diagram of a sound reproducing system according to a fourth embodiment of the present invention.

Next, a sound distribution system of the sound critical points retrieving technology according to a fourth embodiment of the present invention will be described. FIG. 10 is a configuration diagram of a sound distribution system 1000 according to the fourth embodiment of the present invention. This sound distribution system 1000 has a configuration wherein a sound data acquisition unit 99 is added to the sound reproduction system 900 described in the third embodiment. Therefore, only the points of difference between this embodiment and the third embodiment are herein described.

The data supply apparatus 901 of FIG. 10 can supply, in addition to sound property, a sound signal of a music piece stored in the first sound storing unit 92 to a sound reproducing apparatus 904. Then, the sound reproducing apparatus 904 can reproduce, in addition to a sound signal of a music piece stored in the second sound storing unit 95, a sound signal of a music piece supplied from the data supply apparatus 901 via the sound data acquisition unit 99. The method of reproducing a sound signal recorded in the sound storing unit 95 is the same as in the third embodiment. Here, a method of reproducing a sound signal of a music piece supplied from the data supply apparatus 901 is described.

The data supply apparatus 901 supplies, in advance, a portion of or the entirety of a list of pieces of sound stored in the storing unit 92 to the sound reproducing apparatus 904. When a user selects a piece of sound from the above described list as sound to be reproduced, the sound properties acquisition unit 96 acquires the sound property from the storing unit 94 via the communication network 91. Then, the sound data acquisition unit 99 acquires this sound signal of the sound from the storing unit 92 and stores it. When the user requests reproduction, the reproduction control unit 98 controls the sound reproducing unit 97 so as to reproduce the sound according to the requested method of reproduction. At this time, the sound reproducing unit 97 reproduces the sound signal data of this sound stored in the sound data acquisition unit 99.

(Fifth Embodiment)

Figure 11:
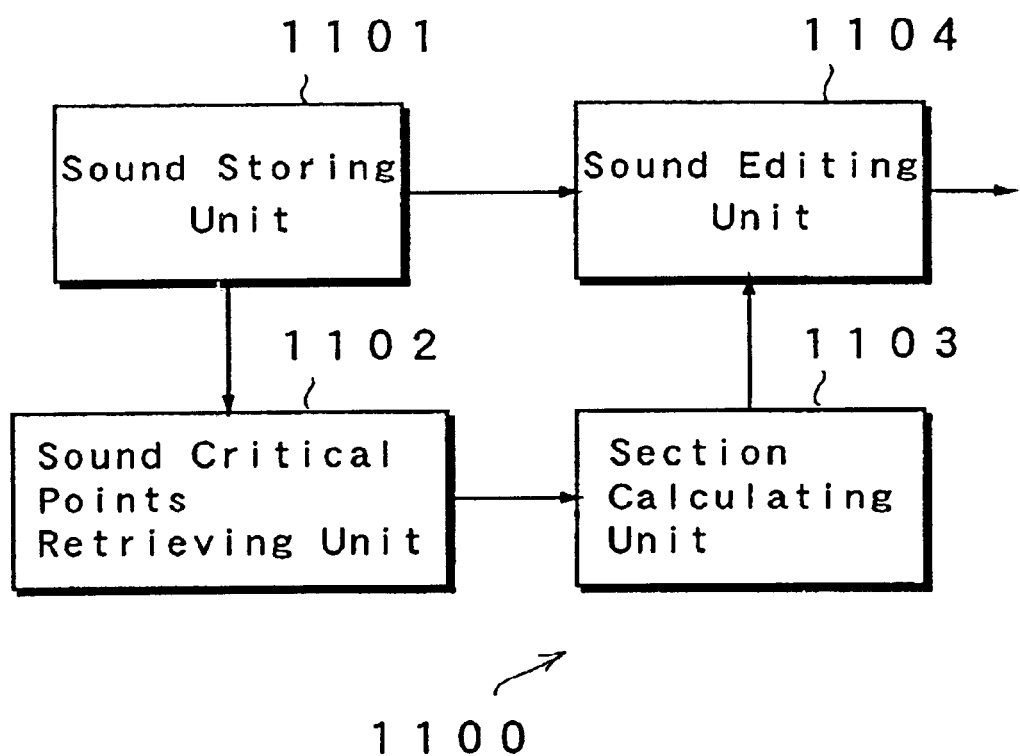
FIG. 11 is a configuration diagram of a sound signal editing apparatus according to a fifth embodiment of the present invention.

Next, a sound signal editing apparatus of the sound critical points retrieving technology according to a fifth embodiment of the present invention will be described. FIG. 11 is a configuration diagram of a sound signal editing apparatus 1100 according to the fifth embodiment of the present invention. This sound signal editing apparatus 1100 includes a sound storing unit 1101, a sound critical points retrieving unit 1102, a section calculating unit 1103 and a sound editing unit 1104.

The sound signal editing apparatus 1100 is used in the case wherein a sound signal is prepared for a specific purpose, for example, trial listening for the EMD (electronic music distribution) system. This sound signal editing apparatus 1100 selects a sound signal portion of an appropriate length of time from a sound signal of a music piece. In the following, the configuration and operation of each of the parts will be described in detail.

The sound storing unit 1101 stores a sound signal in a reproducible form and includes a medium such as CD, DVD, HDD or non-volatile memory, and a section for referring to a sound signal recorded such a medium.

A sound signal of a music piece recorded in the sound storing unit 1101 is inputted to the sound critical points retrieving unit 1102. The retrieving unit 1102 retrieves sound critical points of the recorded sound. The retrieving unit 1102 has the same configuration and operation as the sound critical points retrieving apparatus described in the first embodiment and outputs the sound property including the time property indicating sound critical points of the respective pieces of sound.

The section calculating unit 1103 calculates start point time and end point time of a signal section suitable for the selection from a sound signal on the basis of the data of sound critical points retrieved by the retrieving unit 1102.

As for a method of setting start point time and end point time of the selected section, there is, for example, the following method. Sound critical points retrieved by the retrieving unit 1102 are aligned in time order and sections between the respective critical points are denoted as selected sections. That is to say, start points in this case are the respective critical points while the end points are the next critical points after the start points. Here, each of the sound critical points retrieved by the retrieving unit 1102 is designated as a start point of a selected section, and a point after a constant period of time, for example 30 seconds, from the start point is designated as and an end point of the section.

The sound editing unit 1104 marks, and selects a section from, the sound signal of this sound stored in the sound storing unit 1101 on the basis of section data calculated by the section calculating unit 1103.

This marking is the addition to the sound signal of a mark that explicitly indicates a section to be selected. The marking provides a method of signal editing in a dialogue-like manner to a user of this editing apparatus, for example, to the editor of the sound signal. Here, the selection of the sound signal is limited to the retrieval of the sound signal portion of this time section.

The sound critical points retrieving unit 1102 selects a signal having a critical point thereof designated as a start point in order to retrieve a point of change in the signal, that is to say, a point in time that seems to border phrases of the sound, as described in the first embodiment. According to such a method, the editor of the sound signal can easily select a signal on the basis of sound features of the music piece, for example, can easily select a bridge portion.

Here, in the case where a plurality of sections are calculated by the section calculating unit 1103, the following methods, for example, are cited as methods for section selection. That is to say, there is a method for presentation to the editor of all of the selected sections that have been marked by the edit unit 1104, thereby the sections are selected by the editor according to his or here wish. In addition, there is a method for referring to frequency of occurrence of sound critical points from among property data that has been found at the time of retrieval of sound critical points and for selecting the section of which the start point is the critical point having the highest level of frequency of occurrence of sound critical points as the selected section.

Next, the sound critical point retrieval process described in the first embodiment can be stored on a recording medium as a program for computer operation. The program in this case is referred to as a sound critical points retrieving method program and a recording medium on which this program is recorded is referred to as a recording medium for a program utilizing the sound critical points retrieving method.

In addition, the sound reproducing process described in the second embodiment can be stored on a recording medium as a program for computer operation. The program in this case is referred to as a sound reproducing method program and a recording medium on which this program is recorded is referred to as a recording medium for a program utilizing the sound reproducing method.

In addition, the sound signal editing process described in the fifth embodiment can be stored on a recording medium as a program for computer operation. The program in this case is referred to as a sound signal editing method program and a recording medium on which this program is recorded is referred to as a recording medium for a program utilizing the sound signal editing method.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2001-380139 filed on Dec. 13, 2001 is hereby incorporated by reference.

What is claimed is:

1. A sound critical points retrieving apparatus comprising:
   a sound input unit which inputs a sound signal of a music piece;
   a sound features extracting unit which extracts predetermined sound features from the sound signal given by said sound input unit;
   a cost function calculating unit which calculates a cost function indicating the likelihood of sound critical points from the sound features which have been extracted by said sound features extracting unit;
   a peak detecting unit which detects peak times and peak values in a case where a value of said cost function calculated by said cost function calculating unit indicates a maximal value; and
   a selecting unit which selects sound critical points having likelihood values of a predetermined value or more from said peak times and peak values detected by said peak detecting unit.

2. A sound critical points retrieving apparatus according to claim 1, wherein
   said sound features calculating unit includes at least one of:
   a root mean square calculating block which calculates the root mean square value of said sound signal;
   a beat noisiness calculating block which calculates the beat noisiness of said sound signal; and
   an attack ratio calculating block which calculates the attack ratio of said sound signal.

3. A sound critical points retrieving apparatus according to claim 1, wherein
   said cost function calculating unit outputs a value obtained by multiplying at least two of a root mean square value, attack noisiness and attack points ratio of said sound signal.

4. A sound critical points retrieving apparatus according to claim 2, wherein
   said attack noisiness calculating block includes:
   an attack component detecting section which detects attack components of said sound signal;
   an autocorrelation calculating section which calculates the autocorrelation function of the attack component obtained by said attack component detecting section;
   a spectrum analyzing section which carries out a spectrum analysis of the autocorrelation function calculated by said autocorrelation calculating section;

a DC component detecting section which detects DC components from the output of said spectrum analyzing section;

a maximum value detecting section which detects the frequency component having the maximum value from the output of said spectrum analyzing section; and a dividing section which divides the output of said DC component detecting section by the output or said maximum value detecting section.

5. A sound critical points retrieving apparatus according to claim 2, wherein said attack ratio calculating block includes:

an attack component detecting section which detects attack components in each frequency band of said sound signal;

a segmentation section which outputs 0 in a case where an output of an attack component detected by said attack component detecting section is a threshold value or less, and outputs 1 in a case where an output exceeds said threshold value;

an integrating section which adds the outputs of said segmentation section in the direction of frequency; and a mean value calculating section which calculates the time average of the outputs of said integrating section.

6. A sound critical points retrieving apparatus according to claim 1, wherein said selecting unit selects a predetermined number of peak values detected by said peak detecting unit in the order of the magnitude of their values and outputs times of the selected peak values as time properties of said sound critical points.

7. A sound critical points retrieving apparatus according to claim 1, wherein said selecting unit selects a predetermined number of peak values detected by said peak detecting unit in the order of the magnitude of their values, outputs times of the selected peak values as time properties of said sound critical points, and outputs the peak values of said sound critical points as likelihood property of said sound critical points.

8. A sound critical points retrieving apparatus according to claim 1, wherein said selecting unit selects sound critical points from the peak values detected by said peak detecting unit so that time intervals of said sound critical points become predetermined time intervals or more.

9. A sound reproducing apparatus comprising:

a sound storing unit which stores a sound signal of a music piece;

a sound property storing unit which stores sound property including time property and likelihood property of sound critical points representing the sound borders provided so as to correspond to a sound title;

a sound reproducing unit which reproduces the sound signal of the music piece stored in said sound storing unit starting from an arbitrary position; and a reproduction control unit which controls the reproduction of said sound reproducing unit by referring to the property of sound stored in said sound property storing unit.

10. A sound reproducing apparatus according to claim 9, further comprising:

a sound input unit which inputs a sound signal of a music piece stored in said sound storing unit;

a sound features extracting unit which extracts predetermined sound features from the sound signal given by said sound input unit;

a cost function calculating unit which calculates a cost function indicating the likelihood of sound critical points from the sound features which have been extracted by said sound features extracting unit;

a peak detecting unit which detects peak times and peak values in a case where a value of said cost function calculated by said cost function calculating unit indicates a maximal value; and a selecting unit which selects sound critical points having likelihood values of a predetermined value or more from said peak times and peak values detected by said peak detecting unit and feeds said sound critical points to said sound property storing unit.

11. A sound reproducing apparatus according to claim 9, wherein said reproduction control unit has a reproduction operating block for a user to request reproduction starting from a sound critical point, and carries out reproduction starting from an arbitrary sound critical point according to the indication of said operating block.

12. A sound reproducing apparatus according to claim 10, wherein said reproduction control unit has a reproduction operating block for a user to request reproduction starting from a sound critical point, and carries out reproduction starting from an arbitrary sound critical point according to the indication of said operating block.

13. A sound reproducing apparatus according to claim 10, wherein said selecting unit outputs the time property and the likelihood property of each sound critical point, and said reproduction control unit controls reproduction starting from a sound critical point on the basis of said likelihood property.

14. A sound signal editing apparatus comprising:

a sound storing unit which stores a sound signal of a music piece;

a sound input unit which inputs the sound signal of the music piece stored in said sound storing unit;

a sound features extracting unit which extracts predetermined sound features from the sound signal given by said sound input unit;

a cost function calculating unit which calculates a cost function indicating the likelihood of sound critical points from the sound features which have been extracted by said sound features extracting unit;

a peak detecting unit which detects peak times and peak values in a case where a value of said cost function calculated by said cost function calculating unit indicates a maximal value;

a selecting unit which selects sound critical points having likelihood values of a predetermined value or more from said peak times and peak values detected by said peak detecting unit;

a section calculating unit which calculates a signal section in order to edit sound on the basis of sound critical points selected by said selecting unit; and a sound signal editing unit which edits the sound signal of the music piece stored in said sound storing unit on the basis of the signal section calculated by said section calculating unit.

15. A sound signal editing apparatus according to claim 14, wherein said selecting unit outputs the time property of sound critical points, and calculates the likelihood property of said sound critical points so as to output the result of the calculation, and said section calculating unit calculates a signal section on the basis of the calculated likelihood property of the sound critical points.

16. A sound critical points retrieving method comprising:

a sound input step of inputting a sound signal of a music piece;

a sound features extracting step of extracting predetermined sound features from the sound signal given by said sound input step;

a cost function calculating step of calculating a cost function indicating likelihood of sound critical points from said sound features extracted in said sound features extracting step;

a peak detecting step of detecting peak times and peak values in a case where a value of said cost function calculated in said cost function calculating step indicates a maximal value; and a selecting step of selecting a sound critical points having likelihood values of a predetermined value or more from said peak times and peak values detected in said peak detecting step.

17. A sound reproducing method comprising:

a sound storing step of storing a sound signal of a music piece;

a sound property storing step of storing a sound property including time property and likelihood property of sound critical points representing sound borders provided so as to correspond to a sound title;

a sound reproducing step of reproducing the sound signal of the music piece stored in said sound storing step starting from an arbitrary position; and a reproduction control step of controlling reproduction in said sound reproducing step by referring to the property of sound stored in said sound storing step.

18. A sound reproducing method according to claim 17, further comprising:

a sound input step of inputting the sound signal of the music piece stored in said sound storing step;

a sound features extracting step of extracting predetermined sound features from a sound signal given in said sound input step;

a cost function calculating step of calculating a cost function indicating likelihood of sound critical points from said sound features extracted in said sound features extracting step;

a peak detecting step of detecting a peak times and peak values in a case where a value of said cost function calculated in said cost function calculating step indicates a maximal value; and a selecting step of selecting a sound critical points having likelihood values of a predetermined value or more from said peak times and peak values detected in said peak detecting step and of feeding said sound critical points to said sound property storing step.

19. A sound editing method comprising:

a sound storing step of storing a sound signal of a music piece;

a sound critical points retrieving step of retrieving a sound critical point, which is a sound border, from the sound signal of said sound storing step;

a section calculating step of calculating a signal section which carries out edition of the sound on the basis of the sound critical points retrieved in said sound critical points retrieving step; and a sound editing step of editing the sound signal of the music piece stored in said sound signal storing step on the basis of the signal section calculated in said section calculating step.

20. A recording medium of a sound critical points retrieving method program, which records a program for allowing a computer to perform said sound critical points retrieving process according to claim 16.

21. A recording medium of a sound reproducing method program, which records a program for allowing a computer to perform said sound reproducing process according to claim 17.

22. A recording medium of a sound editing method program, which records a program for allowing a computer to perform said sound editing process according to claim 19.

23. A sound critical points retrieving method program, which allows a computer to perform said sound critical point retrieving process according to claim 16.

24. A sound reproducing method program, which allows a computer to perform said sound reproducing process according to claim 17.

25. A sound editing method program, which allows a computer to perform said sound editing process according to claim 19.

* * * * *

UNITED STATES PATENT AND TRADEMARK OFFICE
CERTIFICATE OF CORRECTION

PATENT NO. : 6,965,546 B2
DATED : November 15, 2005
INVENTOR(S) : Junichi Tagawa et al.

It is certified that error appears in the above-identified patent and that said Letters Patent is hereby corrected as shown below:

Column 18,
Lines 39-47, claims 23-25 should be deleted.

Signed and Sealed this

Seventh Day of March, 2006

JON W. DUDAS
*Director of the United States Patent and Trademark Office*